United States Patent [19]

Hollberg

[11] Patent Number: 4,921,130
[45] Date of Patent: May 1, 1990

[54] VISCOUS MATERIAL DISPENSING APPARATUS

[76] Inventor: Virginia R. Hollberg, 1169 Yale Ave., Salt Lake City, Utah 84105

[21] Appl. No.: 279,996

[22] Filed: Dec. 5, 1988

[51] Int. Cl.$^5$ .............................................. B67D 5/22
[52] U.S. Cl. .................................... 222/46; 222/390; 222/559; 222/536
[58] Field of Search ................. 222/390, 46, 386, 533, 222/559, 536

[56] References Cited

U.S. PATENT DOCUMENTS

| | | |
|---|---|---|
| 1,154,351 | 9/1915 | Tournadre . |
| 1,544,938 | 7/1925 | Sax . |
| 1,621,294 | 3/1927 | Valkenburg ........................ 222/559 |
| 1,941,139 | 12/1933 | Creveling ............................ 222/390 |
| 1,971,127 | 8/1934 | Arnold et al. . |
| 2,051,736 | 8/1936 | Misfeldt . |
| 2,163,974 | 6/1939 | Blett . |
| 2,284,218 | 5/1942 | Livingston ........................ 222/390 |
| 2,289,747 | 7/1942 | Baker ................................. 222/559 |
| 2,540,511 | 2/1951 | Coleman . |
| 2,656,953 | 10/1953 | Rich . |
| 2,842,289 | 7/1958 | Malpas .............................. 222/533 |
| 3,185,345 | 5/1965 | Hunegs ............................. 222/390 |
| 3,481,510 | 12/1969 | Allen, Jr. . |
| 3,993,226 | 11/1976 | Pavenick . |
| 4,437,591 | 3/1984 | von Schuckmann . |
| 4,526,295 | 7/1985 | Morel et al. . |
| 4,544,083 | 10/1985 | Schroeder . |
| 4,658,993 | 4/1987 | Vlasich . |
| 4,684,042 | 8/1987 | Strickler et al. . |

FOREIGN PATENT DOCUMENTS 642077 2/1937 Fed. Rep. of Germany ...... 222/390

Primary Examiner—H. Grant Skaggs
Attorney, Agent, or Firm—Thorpe, North & Western

[57] ABSTRACT

The invention relates to a dispensing assembly which is usable in conjunction with a container holding viscous materials such as shortening, grease, paste or the like. The top and bottom of the container are replaced with a top cover having a dispensing spout adjacent the periphery and a central shaft opening and a bottom cover having a central shaft opening. Interconnecting the top and bottom covers is a threaded shaft which extends through the viscous material in the container. A piston which translates upwardly on the shaft, when the shaft is rotated, is threaded on the shaft and is located between the viscous material and the bottom cover. A wing nut or similar means at the lower end of the shaft secures the top and bottom covers to upper and lower edges of the container. The threads of the shaft are pitched such that a full rotation of the shaft moves the piston upwards a predetermined distance reducing the volume of the viscous material in the container by a predetermined amount and forcing that volume out the dispensing spout. A dial fixed to the upper end of the shaft and above the top cover enables the shaft to be rotated. Indicia on the dial in conjunction with indicia on top cover indicate to the user what volume of viscous material is dispensed through the spout with each rotation or multiple rotations of the dial.

26 Claims, 3 Drawing Sheets

VISCOUS MATERIAL DISPENSING APPARATUS

BACKGROUND OF THE INVENTION

1. Field of the Invention

The invention relates to a viscous material dispensing device and more particularly to a dispensing apparatus usable in conjunction with a container of viscous material. Further, the invention relates to a method of assembling the dispensing device on a container and to a combination of a viscous material container and a dispensing device as a unit.

2. Description of the Prior Art

Removing viscous material such as shortening from a container has long been a messy operation. Often it involved the use of a tool for removing the material, a second tool for removing the material from the first tool, a second container to measure the removed material, and then another round of removal from the measuring container before the shortening could be put to use. THe extensive number of tools and steps required to get shortening from its container to a mixing bowl is not only messy, but also very time consuming and difficult to clean up. The need for a simpler manner in which to remove and measure viscous materials from containers is readily apparent, especially for viscous materials which need to be measured before using.

The prior art discloses many dispensers which can dispense and measure an amount of viscous material from a container. For example, Rich, U.S. Pat. No. 2,656,953, discloses a metered dispensing device for shortening or the like having a can with fixed top and bottom plates. A central piston is connected to the threaded post extending longitudinally through the can. The pitch of the threads on the post is gauged to cause a predetermined amount of material to be dispensed by each full turn of the cover.

Vlasich, U.S. Pat. No. 4,658,993, discloses a metering dispenser for viscous compositions wherein a piston is slidable within a chamber and is fixed to the front end of a plunger rod. The rotation of the plunger rod advances the plunger in the chamber thereby dispensing measured amounts of materials.

Strickler, U.S. Pat. No. 4,684,042, discloses a container and a pressure plate assembly which is used with a viscous material dispenser and is provided with a central threaded post. The pressure plate is forced downwardly along a threaded post to force viscous materials out of an opening at the bottom of the container.

Morel, U.S. Pat. No. 4,526,295, shows a cartridge for injecting a semi-pasty product which is provided with a central threaded rod member.

Arnold et al., U.S. Pat. No. 1,971,127, and von Schuckmann, U.S. Pat. No. 4,437,591, both disclose dispensers for pasty substances in which a piston rises on a rod in the container in response to a driving mechanism.

Most of these prior art devices comprise a piston or plate movable by a threaded shaft, and include some type of handle or drive apparatus to rotate the shaft. Although much of the prior art attempts to conveniently dispense viscous material, none have the particular combination of features which allow the user to dispense and measure a viscous material by upward motion of a piston which moves the material directly to an opening in the top of the container and allows the shaft to be rotated by a dial located on the top of the container.

One major problem not resolved by the prior art devices is the user's need of the dispensing mechanism and the material outlet opening both to be located on the top cover of the device. This is important since it allows the container to remain stationary while in use, such as at rest on a table or the like. It also allows the user to operate the device with only one hand. Prior art devices which have the dispensing mechanism and the material outlet opening on the top cover, such as Rich, U.S. Pat. No. 2,656,953, require the insertion of a tube from the container top, through the piston plate and the viscous material, to the container bottom. Thus, when the piston is pushed downwardly on the material, a portion of the material is forced up the tube and exits at the outlet opening in the top cover. This design significantly increases the number and complicity of parts, which necessarily increases manufacturing costs. Also, dispensing devices of this type are very hard to operate since the user has to force the viscous material down inside the container and then up through a relatively long tube before it can exit. Finally, when the piston of such a device is at the bottom of the container there remains a significant amount of material in the tube. This material is wasted unless removed by hand after the container has been removed, thus creating a cleanup problem.

Another problem experienced by these prior art devices is the difficulty in securing the top cover of the device to the container. Because of the forces required to push material down to the bottom of the container, then back up through the tube to an outlet opening, extraordinarily complicated and expensively manufactured means of securing the cover and container together are utilized. If not, forces intended to expel material from the container, instead cause a separation of the container from the cover. The mess, waste and inconvenience caused by a cover separating from the container while in use severely limits the device's appeal to the consumer.

SUMMARY OF THE INVENTION

An object of the present invention is to provide a simple apparatus for easily removing premeasured viscous material from a container, wherein top and bottom covers of the container are replaced by the top and bottom covers of the apparatus, and wherein the viscous material is expelled upwardly by movement of a piston located in the container below the viscous material.

A further object of the present invention is to provide an apparatus as above which has a spout, located in the top cover, for allowing dispensing of material from the container in a manner which prevents excess waste.

A further object of the present invention is to provide an apparatus as above wherein the spout has a reclosable cap which opens the spout in a first position, and which cuts off dispensed material as it moves to a closed second position.

A further object of the present invention is to provide the top cover and associated dial means. The rotation of which causes the piston to move upwardly, with markings which cooperate to show the amount of material dispensed when the dial is rotated.

These and other objects of the present invention are realized in a specifically illustrated embodiment of a dispensing apparatus having a top cover to cover the top of the container and a bottom cover to engage the bottom of the container. The top cover and the bottom cover are connected by a threaded shaft which, when rotated, moves a piston from the bottom cover toward the top cover to expel viscous material from the container. The top cover has a spout opening which allows material to exit the container and a shaft opening which allows a dispensing dial and the threaded shaft means to be connected therethrough. The dial is connected to the upper end of the threaded shaft above the top cover such that rotation of the dial causes rotation of the threaded shaft and movement of the piston toward the top cover. The dial may contain a position indicator and the top cover may contain indicia which, when used in conjunction, allows the user to measure the amount of material being dispensed from the container.

DETAILED DESCRIPTION OF THE INVENTION

Figure 2:
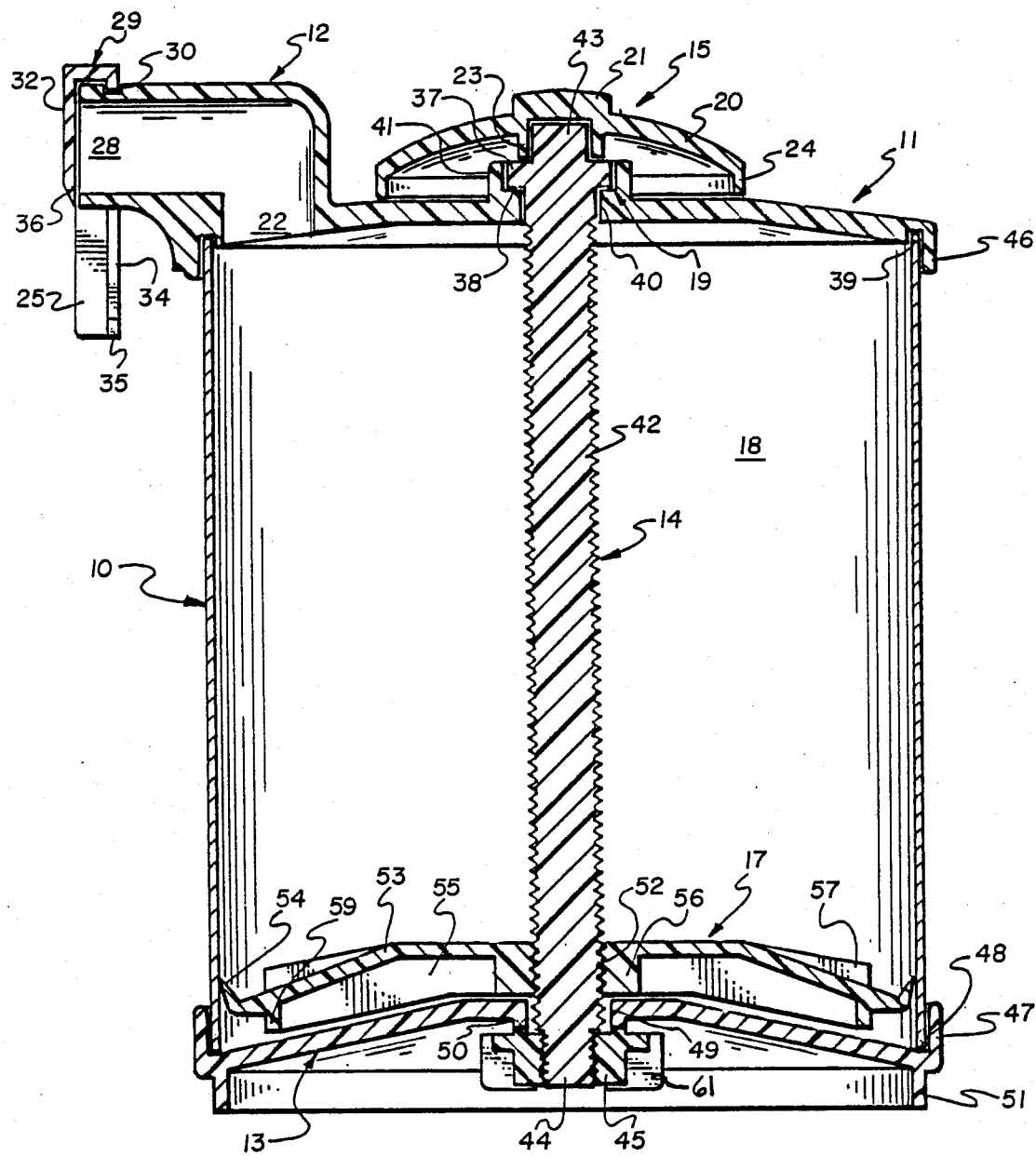
FIG. 2 is a cross-sectional view of the present invention mounted for use on a container taken along line 2—2 of FIG. 1 and showing the working mechanism thereof.

FIG. 2 shows a complete and preferred embodiment of the dispensing apparatus of the present invention in conjunction with a container of viscous material. The container 10 can be any shape or size including cylindrical, square, etc. and can contain any type of viscous material 18 such as shortening, grease, paste, gel, or the like. The container 10 is made of a conventional material such as metal, paper or plastic by techniques well-known in the art. Top cover 11 of the device is attachable to the top lip 39 of the container 10 by means of circumferential lip 46 in any conventional sealing manner such as a snap fit, a threaded fit, or the like, and is intended to take the place of the container's own top cover. The top cover 11 also contains a spout opening 22, into which a spout 12 is mounted allowing the viscous material 18 to be dispensed, and a shaft opening 19 which allows the threaded shaft 14 to pass through in a manner which will be explained below.

Figure 1:
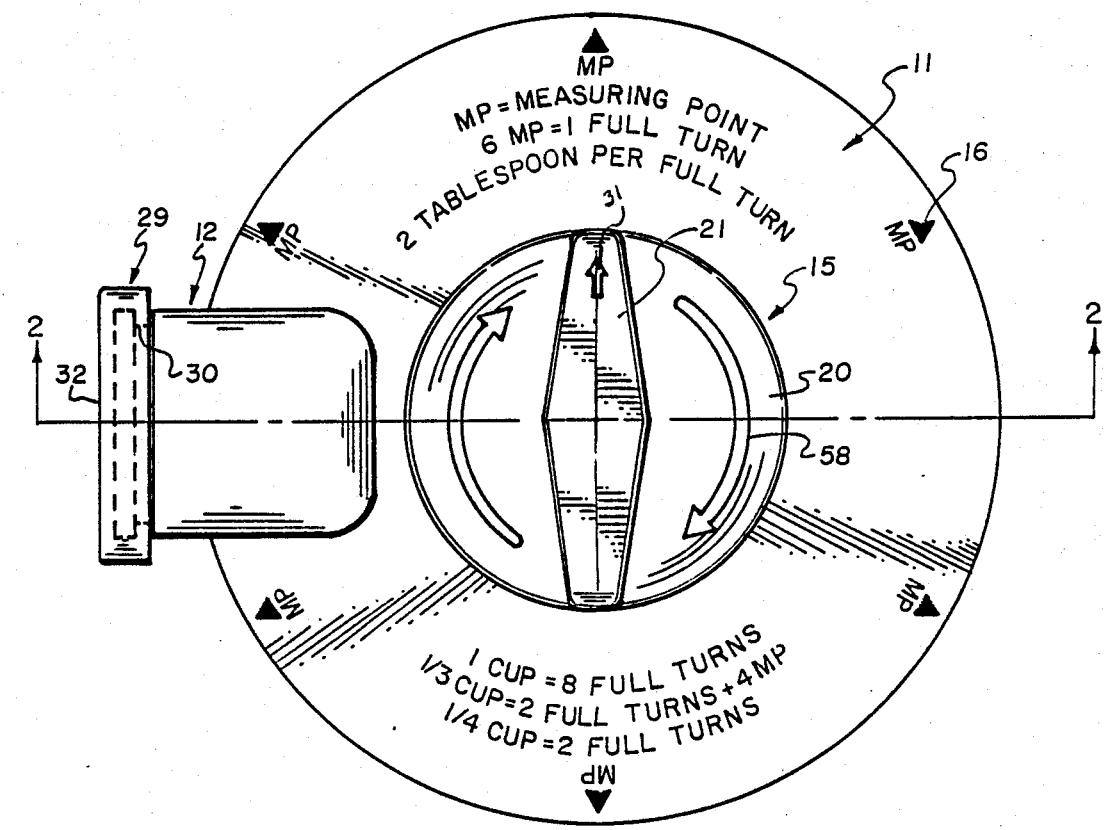
FIG. 1 is a top view of the present invention showing the top cover, the dispensing spout, and the dispensing dial.
Figure 6:
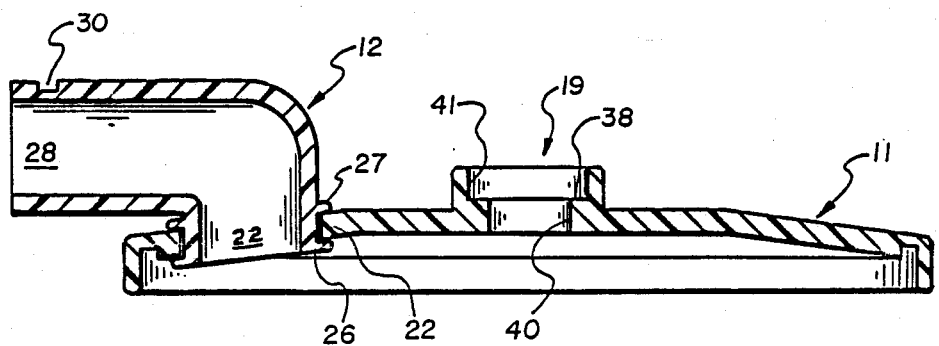
FIG. 6 is a cross-sectional view of an alternative embodiment of the top cover showing a rotatable spout.

The spout 12 contained in or about opening 22 can protrude beyond the edge of the top cover 11 as shown in FIG. 1, or can be shortened so as to remain flush with the top cover edge. Alternative embodiments of this spout which allow for greater ease in manufacturing and/or packaging are anticipated. For example, the spout 12 may be rotatably attached to the top cover 11 in opening 22 in the manner shown in FIG. 6, in order that it may be rotated inwardly of the edge of the top cover when packaged or stored and rotated outwardly of the top cover edge when in use. This is accomplished by manufacturing the spout separately from the top cover and holding it in place in the spout opening 22 by means of sealing lip 26 and sealing ring 27 such that it may rotate in the opening 22. Alternatively, the spout may be mounted in opening 22 such that it will slidably translate from a first position where the spout extends beyond the edge of the top cover to a second position where the spout is flush with, or spaced inwardly from, the top cover edge. This can be done by modifying opening 22 to comprise a track structure which would accommodate a ridge located at the base of the spout, or vice versa (not shown), such that the spout could slide relative to the top cover.

The ability of the spout to move inwardly of the edge of the top cover would reduce the space needed to store the container and would significantly simplify the packaging of the device and container when manufactured as a unit. This will be explained momentarily.

Figure 3:
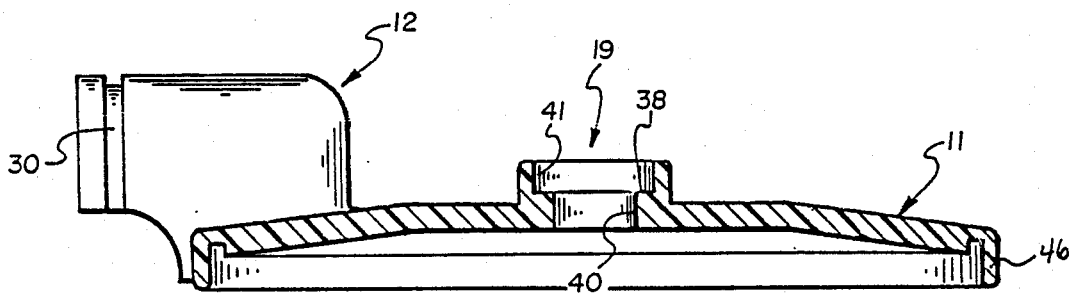
FIG. 3 is a cross-sectional view of the top cover of the invention.

The spout may also be formed as an integral part of cover 11 as shown in FIGS. 2 and 3.

Figure 4:
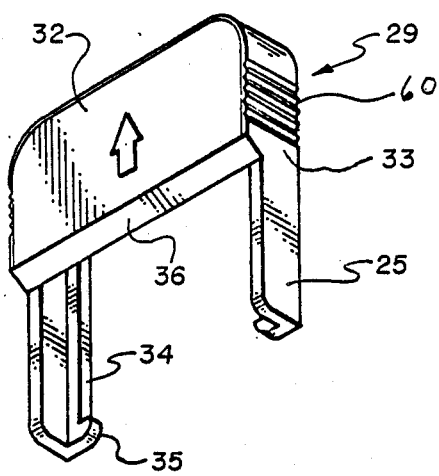
FIG. 4 is a perspective view of the reclosable spout cap of the invention.

The spout 12 has an outlet opening 28 which is covered by cap 29. As best seen in FIGS. 2 and 4, cap 29 is comprised of a face piece 32 which serves to block the opening 28 of the spout 12 when in place in a closed position. A U-shaped attachment member 33 extends around the top and both sides of the face piece 32 in a plane perpendicular to its front surface in a manner such that the legs 25 of the U-shaped member extend beyond its bottom side. A U-shaped lip 34 is attached to the opposite end of the U-shaped member 33 in an inward direction so as to be in a plane parallel to the face piece 32. At each distal end of the U-shaped lip 34 is a hook 35 extending inwardly in the same plane as the lip 34. The spout 12 is constructed with a slot 30 located proximate its outlet opening 28. The slot 30 extends continuously around the top and both sides of the spout 12 and can accommodate the lip 34 in a slidable manner. There exists sufficient friction between the lip 34 and the slot 30 that the cap 29 will remain at any position placed in by the user. Therefore, the cap 29 can be slid from a closed position where the face piece 32 is blocking the spout opening 28, to an open position where the face piece 32 remains frictionally held above the opening 28. In this open position, hooks 35, located on the bottom edges of the lip 34, meet the bottom of the spout 12 preventing the cap 29 from being separated from the spout. Gripping ridges 60 may also be provided on the U-shaped member 33 to allow for a secure grip by the user's fingers when moving the cap 29.

The edge portion of the face piece 32 which is not attached to the U-shaped member, is slanted to form a cutting edge 36, as shown in FIG. 4. When the viscous material 18 is forced out of the spout 12, it may remain cohesively attached to the viscous material remaining inside the spout 29 and therefore must be separated. When the cap 29 is pushed downwardly to its closed position, the cutting edge 36 conveniently separates the expelled material from the material remaining inside the spout. This alleviates the need for any other tool such as a knife, or the user's hand, from being required to separate the expelled viscous material from the container and also aides in insuring precise measurement of the amount of material dispensed.

The shaft opening 19 in the top cover 11 comprises a small inner opening 40 which is sufficiently large to allow the threaded portion 42 of the threaded shaft 14 to pass through, and a larger outer opening 41 which allows the integrally formed washer portion 37 of the threaded shaft 14 to seat and rotate in a low friction manner on seat 38. On the top of the threaded shaft 14, integral with the washer 37, is formed a mounting lug 43 which allows attachment of the dispensing dial 15, as will be later described.

The position of shaft 14 between the ends contains threads 42 which are selectively pitched to cause piston 17 to move upward a predetermined distance upon each full rotation. This predetermined distance can be equated to a volume amount of material dispensed from the container during each rotation. For example, a common shortening container, being approximately 5 inches in diameter, contains approximately 1 ½ cups of volume per inch of its height. Therefore, a shaft having 12 threads per inch would deliver 1 ½ cups of shortening every 12 turns of the shaft. It follows that eight turns of the shaft would deliver 1 cup, etc. This information can easily be reduced to a set of markings on the top cover 11 and dial 15 as will be explained momentarily. It is, of course, anticipated that the actual pitch of the shaft threads used on the device would depend upon the usually required dispensing amounts of the particular viscous material. For more viscous materials, a lesser pitch may be desired. On the other hand, the pitch may be increased for less viscous or semi-liquid materials.

The threaded shaft 14 extends through the bottom cover 13 and contains a smaller diametered threaded end section 44 which attaches to a nut 45. Nut 45 provides the user with sufficient surface area, such as wings 61, to grip and rotate the nut 45 onto and off of the end 44 of the shaft 14 without the need for a wrench or the like.

Bottom cover 13 is intended to replace the original container bottom as explained above. The circumferential lip 47 attaches to the container's bottom lip 48 in the same manner as described for the top cover 11. The bottom cover 13 also contains a central shaft opening 49 which allows the shaft 14 to pass through and attach to the nut 45. The portion of cover 13 surrounding shaft opening 49 is thickened to provide a protruding ring-shaped surface 50 which meets with the wing nut 45 in a relatively low friction relationship. By holding lug 43 in a fixed position, the wing nut 45 will thread on to the shaft end 44 until it meets with surface 50 of cover 13 and fixedly secures top cover 11 and bottom cover 13 to the upper and lower edges of container 10, respectively. Any further rotation of the nut 45, when lug 43 is not held, allows the shaft 14 to rotate on surface 50 with relatively little friction.

Bottom cover 13 has a ridge 51 located around its entire circumference which is directed outwardly in the direction generally opposite the circumferential lip 47. This ridge 51 is sufficiently high to allow the bottom cover 13 to be placed on a flat surface, such as a table or the like, in a manner that contact of the flat surface with the nut 45 is avoided. This is important since the nut 45 must be able to turn freely along with shaft 14 when material is being dispensed. The ridge 51 may of course be of any design, shape or configuration as long as it functions to elevate the nut 45 off of the flat surface.

Piston 17 is locatable on the shaft 14 in between the top and bottom covers. Shaft 14 passes through the threaded piston opening 52 in a manner which allows it to translate up and down the shaft 14 when the shaft is rotated. The piston comprises a plate 53 which may be flat or which may taper off toward its outer edge as shown in FIG. 2, and terminates in a beveled circumferential edge 54 which functions to cleanly remove viscous material as it slides up the interior wall surface of the container 10. Radially extending support beams 55 and thickened support ring 56 are formed integrally with the piston and function to reinforce the plate section 53 and the threaded opening 52. An outer support ring 59 and any number of radial beams 55 may be used to provide piston 17 with sufficient strength and rigidity to prevent any deformation in operation which would cause leakage of the viscous material between its edge 54 and the interior wall surface of the container.

The piston 17 is prevented from rotating along with the shaft 14. When used with most types of viscous materials, the frictional forces of the viscous material on the piston alone is sufficient to prevent its rotation. Presumably the viscous material adheres to the surface of the piston. However other means, such as friction ribs 57 attached to or made integral with the top surface of the piston 17 may be used. Alternatively, a guide rod (not shown) or the like, attached to the top cover 11 and extending through an aperture in the piston 17 at a point away from its center will also prevent rotation.

Figure 5:
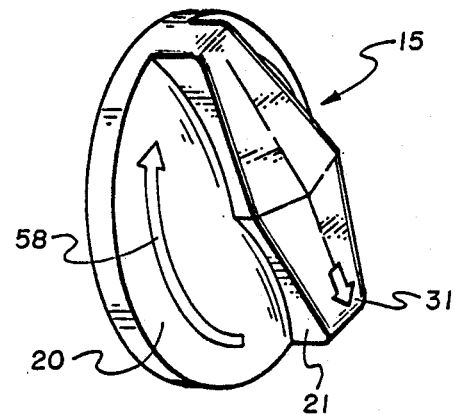
FIG. 5 is a perspective view of the dial of the invention.

Dispensing dial 15 as shown in FIGS. 1 and 5 comprises a disk 20 with a positioning knob 21 attached to or integrally formed in the top thereof. The positioning knob 21 may be shaped so as to point in a specific direction, or may contain a direction indicator such as arrow 58, which can convey to the user the relative rotational position of the dial 15. Rotation direction indicators, such as arrows 58 may also be placed on the dial 15. The bottom of dial 15 comprises two sets of opposing side and end ridges 23, best shown in FIG. 2, which are configured to engage and snugly fit over the mounting lug 43 of the shaft 14 to facilitate shaft rotation. However, it is also intended that the dial 15 and the lug 43 be made as an integral one piece unit if so desired, without departing from the scope of the invention. Therefore, reference to lug 43 and dial 15 as separate parts is deemed to be inclusive of their being combined as an integral unit. Lip 24 of the disk portion 20 meets with, or is adjacent to the surface of top cover 11 when the dial 15 is in place over the mounting lug 43.

Arrow 31 and dial 15 point to various indicia 16 which are attached to, or integrally formed in, the surface of top cover 11. These indicia are useful to indicate a particular amount of material dispensed. Since the top cover 11 remains stationary in use, the positioning knob 21 will move past the indicia 16 as the dial 15 is rotated, giving an indication to the user as to the quantity of material dispensed and/or the necessary rotation to dispense a given quantity. The indicia may, of course, be of any style and are not limited to what is shown. They may also indicate any unitary volume amount desired (i.e., tablespoons, teaspoons, cups, fluid ounces, etc.) depending on the material to be dispensed and its common usage. The top cover may also be imprinted with general instructions as to the number of rotations required to deliver any of several desired amounts.

The dispensing apparatus of the present invention is preferably made of a rigid non-toxic plastic, but also may be made of any metal or other suitable material according to the requirements of a particular use.

The present invention can be used either as an adaptation to a separate container, or manufactured as a part of an original container. When used in conjunction with an existing container such as the type used for shortening or the like, the user need only remove the original top lid of the container and snap or screw on the top cover 11, then remove the original bottom lid of the container and insert the threaded shaft 14 into the shaft opening 19 of the top cover 11 until the shaft washer 37 seats in larger opening 41 against seat 38. The bottom of shaft 14 will then extend beyond the bottom of the container 10 and can be inserted through the threaded piston opening 52. Piston 17 is then wound down the shaft 14 until sufficient room is made to place the bottom cover shaft opening 49 over the shaft 14. Then wing nut 45 is screwed on to the smaller diametered end section 44 of the shaft 14 until it meets with the ring shaped surface 50. Wing nut 45 is further tightened on end section 44 until the container 10 is tightly sandwiched between top cover 11 and bottom cover 13. When this is completed, the entire unit can be placed on a flat surface and the dial 15 can be pushed down onto mounting lug 43, thus completing the assembly. Such a simple assembly lends itself well to use on any container of viscous material. The invention can easily be manufactured such that it will fit on any container simply by adjusting the dimensions of the top and bottom covers, the piston and threaded shaft. Use of the present invention on any size or shape of container is intended to come within the scope of this disclosure.

Alternatively, the present invention can be assembled as part of the originally manufactured container. A container 10 made without top or bottom lids could have the top cover 11, with threaded shaft 14 in placed therein, attached to the top lip of the container as heretofore explained. The container 10 could then be filled from the bottom with viscous material to the desired level leaving enough of the shaft 14 exposed to add the piston and the bottom cover in the same manner as previously explained. Finally, the dial could be pushed into place over the mounting lug 43 to complete the assembly.

Such simple assembly allows for inexpensive production and ease of consumer use. Also, since the dispensing assembly adds almost no extra size to the container, it can be easily packaged and shipped for resale with little or no modification to the present commonly used manufacturing and packaging methods. As previously noted, the cover plate may be modified to allow for more convenient packaging of the preassembled container and dispensing assembly. It is anticipated that the spout 12 may be shortened to remain flush with the top cover edge, or it may be made to rotate or translate so as to avoid extending beyond the edge of the top cover when not in use, but rotatable or translatable to extend beyond the top cover edge when in use. Also, any design modifications intended to improve or lower the profile of the preassembled container and dispensing apparatus in order to allow for greater ease in manufacturing and/or packaging is herein contemplated. Further, any well-known means for closing the spout opening is contemplated by the invention, such as a pull tab, a snap-fitting cover, means for opening and closing as a result of rotation or translation of the spout in any manner, etc.

While the preferred embodiment of the present invention has been illustrated and described in detail, it is to be particularly understood that the present invention is not limited by that description, but is instead subject to variations in structural details without departure from the scope of the invention.

I claim:

1. An apparatus for dispensing viscous materials from a container having open upper and lower ends, said apparatus comprising:

threaded shaft means centrally locatable in said container having a lugged washer shaped upper end and a threaded lower end;

top cover means fittable over the open upper container end in a sealing relationship said top cover means containing a discharge opening adjacent the periphery thereof and a central opening through which said threaded shaft means may be inserted up to said lugged washer shaped upper end;

bottom cover means fittable over the open lower container end in fixed relationship said bottom cover means containing a central opening through which the lower end of said threaded shaft means may be inserted;

piston means having a central threaded opening which is threadably engageable to said threaded shaft and locatable between said top and bottom cover means and adapted to move upwardly along said shaft in response to the rotation of said shaft such that the volume of said viscous material in said container will be decreased when said apparatus is assembled on said container and said piston moves upwardly, said piston being sized such that the perimeter thereof will sealingly engage the interior surfaces of said container as said piston moves along said shaft;

attachment means securable to said threaded lower end of said shaft means to fixedly secure said top and bottom covers to said top and bottom edges of said container and freely rotatable against the bottom surface of said bottom cover when said shaft is rotated;

a rotatable dial attachable to said lugged washer shaped end of said shaft means, the rotation of which causes said shaft to rotate and the piston means to move upwardly along said shaft and dispense viscous material through said discharge opening, said top cover containing a spout mounted over said dispensing opening for directing the flow of viscous material, said spout forming a spout opening therein, and a cap means attached to said spout, said cap means comprising a flat face piece having side surfaces, and a generally U-shaped attachment member attached to said extending around a substantial portion of said side surfaces, said attachment member being slidable in a linear direction from an open position wherein the flat face piece is positioned away from the spout opening to allow the material to exit the spout opening, to a closed position wherein the flat piece is positioned to cover the spout opening to prevent material from exiting the spout opening.

2. A dispensing apparatus according to claim 1 wherein, when assembled, the threads of said threaded shaft are pitched such that a complete revolution of said shaft will move said piston upward to force a measured amount of viscous material through said discharge opening by reducing the volume of said viscous material in said container by a predetermined amount.

3. A dispensing apparatus according to claim 2 wherein said dial contains position indicating means.

4. A dispensing apparatus according to claim 3 wherein said top cover means contains indicia means for use in conjunction with said position indicating means such that an accurate measurement of the amount of viscous material dispensed by rotation of said threaded shaft means and consequent upward movement of said piston means can be obtained.

5. A dispensing apparatus according to claim 4 wherein said top and bottom covers and said piston are circular.

6. A dispensing apparatus according to claim 4 wherein the area surrounding the central opening in said top cover is reinforced by an upwardly extending rim into which the lugged washer of said upper portion of the threaded shaft means is seatable.

7. A dispensing apparatus according to claim 4 wherein the area surrounding the central opening in said bottom cover is reinforced by a downwardly protruding ring against which the attachment means slidably rotates.

8. A dispensing apparatus according to claim 4 wherein said piston extends outwardly and then downwardly away from said central threaded opening and is reinforced by radially extending beams on the lower surface thereof.

9. A dispensing apparatus according to claim 1 wherein said spout means extends beyond the periphery of the top cover.

10. A dispensing apparatus according to claim 1 wherein said spout means is flush with the periphery of the top cover.

11. A dispensing apparatus according to claim 1, wherein said spout means is movably attached to allow it to extend beyond the periphery of the top cover when in a first position and inwardly from the periphery of the top cover when in a second position.

12. A dispensing apparatus according to claim 1 wherein said cap means contains cutting means to sever viscous material extending from said spout as said cap means is slid from an open to a closed position.

13. A dispensing apparatus according to claim 1 wherein said piston means contains contact means extending upwardly from the upper surface thereof for increased contact between said piston and viscous material.

14. A dispensing container for dispensing viscous materials therefrom comprising:
  a walled container having upper and lower ends and a continuous interior,
  top cover means fitted over the upper container end in a sealing relationship, said top cover means containing a discharge opening adjacent the periphery thereof and a central opening through which a threaded shaft means may be inserted;
  bottom cover means fitted over the lower container end in fixed relationship, said bottom cover means containing a central opening through which the lower end of a threaded shaft means may be inserted;
  threaded shaft means centrally located in the container having a lugged washer shaped upper end and a threaded lower end said shaft means being inserted through said central opening in said top cover means up to the washer shaped upper end and also the threaded lower end inserted through said central opening in said bottom cover means;
  piston means having a central threaded opening threadably engaged to said threaded shaft and located between said top and bottom cover means and adapted to move upwardly along said shaft in response to the rotation of said shaft such that the volume of said viscous material in said container will be decreased as said piston moves upwardly, said piston being sized such that the perimeter thereof sealing engages the interior surfaces of said container as said piston moves along said shaft;
  attachment means secured to said threaded lower end of said shaft means fixedly securing said top and bottom covers to said top and bottom edges of said container and freely rotating against the bottom surface of said bottom cover when said shaft is rotated;
  a rotatable dial attached to the lug of said lugged washer shaped upper end of said shaft means, the rotation of which causes said shaft to rotate and the piston means to move upwardly along said shaft and dispense viscous material through said discharge opening,
  said top cover containing a spout mounted over said dispensing opening for directing the flow of viscous material, said spout forming a spout opening therein, and
  a cap means attached to said spout, said cap means comprising a flat face piece having side surfaces, and a generally U-shaped attachment member attached to and extending around a substantial portion of said side surfaces, said attachment member being slidable in a linear direction from a open position wherein the flat face piece is positioned away from the spout opening to allow the material to exit the spout opening, to a closed position wherein the flat face piece is positioned to cover the spout opening to prevent material from exiting the spout opening.

15. A dispensing container according to claim 14 wherein the threads of said threaded shaft are pitched such that a complete revolution of said shaft will move said piston upward to force a measured amount of viscous material through said discharge opening by reducing the volume of said viscous material in said container by a predetermined amount.

16. A dispensing container according to claim 15 wherein said dial contains position indicating means.

17. A dispensing container according to claim 16 wherein said top cover means contains indicia means for use in conjunction with said position indicating means such that an accurate measurement of the amount of viscous material dispensed by rotation of said threaded shaft means and consequent upward movement of said piston means can be obtained.

18. A dispensing container according to claim 17 wherein said container, top and bottom covers and said piston are circular.

19. A dispensing container according to claim 17 wherein the area surrounding the central opening in said top cover is reinforced by an upwardly extending rim into which the lugged washer of said upper portion of the threaded shaft means is seatable.

20. A dispensing container according to claim 17 wherein the area surrounding the central opening in said bottom cover is reinforced by an downwardly protruding ring against which the attachment means slidably rotates.

21. A dispensing container according to claim 17 wherein said piston extends outwardly and then downwardly away from said central threaded opening and is reinforced by radially extending beams on the lower surface thereof.

22. A dispensing container according to claim 14 wherein said spout means extends beyond the periphery of the top cover.

23. A dispensing container according to claim 14 wherein said spout means is flush with the periphery of the top cover.

24. A dispensing container according to claim 14, wherein said spout means is movably attached to allow it to extend beyond the periphery of the top cover when in a first position and inwardly from the periphery of the top cover when in a second position.

25. A dispensing container according to claim 14 wherein said cap means contains cutting means to sever viscous material extending from said spout as said cap means is slid from an open to a closed position.

26. A dispensing container according to claim 14 wherein said piston means contains contact means extending upwardly from the upper surface thereof for increased contact between said piston and viscous material.

* * * * *